(12) United States Patent
Shuniak

(10) Patent No.: US 6,845,833 B2
(45) Date of Patent: Jan. 25, 2005

(54) ALL-TERRAIN VEHICLE

(76) Inventor: Lawrence Shuniak, 10276 SW. 25th St., Webster, FL (US) 33597

( * ) Notice: Subject to any disclaimer, the term of this patent is extended or adjusted under 35 U.S.C. 154(b) by 0 days.

(21) Appl. No.: 10/442,622

(22) Filed: May 21, 2003

(65) Prior Publication Data

US 2004/0231901 A1 Nov. 25, 2004

(51) Int. Cl.[7] .............................. B60V 1/11; B60V 1/14
(52) U.S. Cl. ...................................... 180/119
(58) Field of Search ................... 180/116, 117, 180/119

(56) References Cited

U.S. PATENT DOCUMENTS

| | | | | |
|---|---|---|---|---|
| 3,548,968 A | * | 12/1970 | Aronson | 180/119 |
| 4,019,698 A | * | 4/1977 | Earl | 244/110 A |
| 4,282,946 A | * | 8/1981 | MacGuire | 180/128 |
| 4,591,015 A | * | 5/1986 | Korppoo et al. | 180/119 |
| 5,377,775 A | * | 1/1995 | Rush | 180/116 |

* cited by examiner

Primary Examiner—Kevin Hurley
(74) Attorney, Agent, or Firm—Pendorf & Cutliff

(57) ABSTRACT

The present invention concerns an all-terrain vehicle for use over a variety of terrain. The vehicle includes a main body having a cabin, a forward side, a backward side and two lateral sides; a pair of ground effect wings connected to the lateral sides of the main body, each wing having an angle of attack; a lift engine having necessary auxiliary equipment for operation thereof, wherein the lift engine is connected to the backward side of the main body and supplies a lift power to the vehicle; at least one lift fan connected to the lift engine; an engine mounted to the main body to provide energy to propel the vehicle forward; a wheel connected to the forward side of the main body, wherein the wheel is connected to the main body by a drive shaft; a control system to control the angle of attack.

18 Claims, 3 Drawing Sheets

ALL-TERRAIN VEHICLE

BACKGROUND OF THE INVENTION

1. Field of the Invention

This invention relates to vehicles, and more particularly, to vehicles that have the capability of traversing various types of terrain.

2. Description of the Related Art

Throughout the centuries, man has searched for ways to travel over uneven surfaces for performing various activities in both civilian and military situations. In situations such as surveillance, exploration, target acquisition and/or designation, data acquisition, communications relay, decoy, jamming, persecution, weapons or supply deliveries, a number of men and equipment must move back and forth on rough terrain to complete a task.

The prior art shows that four-wheel drive vehicles are the preferred vehicles used for traveling through a rough terrain. These vehicles can, given enough time, go almost anywhere the field operations require them to go, but speed is, in most instances, severely held back by mud all spring, snow all winter, and bumpy ground all year. In many thousands of miles of off-road driving, the speed of a four-wheel drive truck is limited to only three to five miles per hour on seemingly flat or gently rolling terrain because the small surface irregularities of the ground will tear up the truck and bruise the driver at speeds over five miles per hour.

It seems obvious that a better form of off road transportation is needed. The easiest solution would appear to be a vehicle that can fly just above the bumps, but once the vehicle becomes an aircraft, costs and complexity seem to make it uneconomical to use in the field.

One of the most versatile tactical aircraft is the helicopter that is well suited to both day and night operations due to its unique ability to hover. Helicopters are great to use in the field, but at a current rate of approximately one hundred twenty-five dollars per hour, they cannot compete with the four-wheel drive vehicles for much of the market.

In recent years, the prior art shows the use of ground effect vehicles for performing, various activities in both civilian and military situations where the use of four-wheel drive vehicles is not appropriate and/or feasible.

Ground effect vehicles are those vehicles which receive reduced drag due to the reduction of wing-tip vortices while traveling at low altitudes near ground, and more typically, near water.

U.S. Pat. No. 4,282,946 entitled "Multi-Terrain Vehicle" to MacGuire, discloses a multi-terrain vehicle for traveling on or above the ground or the like. The multi-terrain vehicle has a rigid body portion and a series of rigid ribs that are rotatably connected on each side of the body portion that are capable of being rotated to their fully deployed positions. A sailcloth made from a material known by the trademark Dacron is located between each of the ribs so that the ribs and the sailcloth provide a collapsible air duct. When these air ducts are extended and provided with a source of air, this air can cause the multi-terrain vehicle to float or be located above the ground or the like. The rigid ribs also have spring members or the like that permit them to be self-adjusting to automatically maintain proper ground clearance. When the ducts are deployed, the multi-terrain vehicle can be moved horizontally over the ground by controlling the amount of airflow through the various ducts. The multi-terrain vehicle also has retractable wheels that permit it to travel over suitable terrain such as a road or the like. When these retractable wheels are extended, the collapsible ducts would normally be collapsed up against the respective sides of the body portion. The collapsible ducts and the retractable wheels of the multi-terrain vehicle permit it to travel over a wide variety of types of terrain.

The Multi-Terrain vehicle of MacGuire can fly just over the bumps with comparatively little power and is a simple vehicle, but the pure ground effect machine has inherent disadvantages. The vehicle cannot be easily transported on public highways or fit through narrow canyons or gates so the base must fold up into a smaller truck-size package for practicality.

In recent years, the marine engineering arts have developed a ground effect craft that either induces ground effect, such as a hovercraft, or utilizes some benefits of ground effect in combination with hydrodynamic hull and fin arrangements, such as catamarans and hydrofoils. Other maritime ground effect aircraft are being developed, and typically include ground effect wings to provide greater stability and lift. They cannot, however, sustain flight without maintaining close distance to the ground.

Hovercrafts perform very well in small to moderate waves because the air cushion insulates the passengers from the wave shock. Unfortunately for the hovercraft, when the seas reach a certain height, the skirt looses contact with the water in the troughs of the waves, and the air cushion gushes out.

Hovercraft can operate over water, ice, mud, snow, and soft sand for limited distances; however, they have difficulty with uneven surfaces like rocks, ice packs or high waves. The hovercraft reduces the drag by pumping air under the hull so when they are stationary, they loose the cushion and wallow in the sea. Another problem with hovercraft is they do not handle well although they are very adaptable.

Another disadvantage presented by the Hovercraft is that it is designed to work mainly in water. Water surface is very different than land surface, thus a vehicle that is good in water, may not work in land.

The prior art also teaches the use of Wing in Ground effect (WIG) vehicles (flying boats); this type of vehicle intended to cruise just above wave crests so as to avoid all but very occasional water contact during flight. Wig aircraft possess one or more wings that are generally larger than the foils of hydrofoil craft. When a WIG aircraft has accelerated to a sufficient velocity through the water, the aerodynamic lift created by the wings, lifts the aircraft out of the water. WIGs fly close to the water so that the increased lift efficiency provides transportation with less drag than they would encounter at higher altitudes.

WIG aircraft are still theoretical, but they should travel fast and operate over water, land, ice, mud, snow, and soft sand. Their drag to lift ratios is very good, but they require smooth surfaces to land and take off. They also have technical difficulties in rough air commonly found over waves and other irregular terrains. Their load flexibility is similar to airplanes so they are only useful for high value cargoes at this time. The WIG designers seem preoccupied with making an existing airplane concept fly close to the ground and have not looked at land bound vehicle design for solutions.

U.S. Pat. No. 5,592,894 entitled "Spidercraft" to Johnson, discloses a craft supported by a wave rider pod consisting of very large wheels and ground effect wings connected to a suspension system to absorb the shocks from planning over rough seas or rolling over rough terrain. This craft possesses at least one hull or cabin, at least one support arm with a suspension system, and at least one flotation wheel. The suspension system with springs and shock absorbers allows the wave rider pod to move in concert with the waves or rough terrain while the cabin of the craft remains relatively stable.

A disadvantage presented by the Spidercraft is that the size of the vehicle does not allow the vehicle to fit through narrow canyons or gates.

In summary, the vehicles discussed above do not travel fast, are designated to work in water, and are too big to fit through narrow canyons or gates or require smooth surfaces to land and take off.

It appears from the prior art that no invention has a satisfactory solution for traveling over land, ice, mud, snow and soft sand without slowing down for rough conditions.

SUMMARY

It is an object of the present invention to provide an all-terrain vehicle having a variety of capabilities while being sufficiently small so as to be easily transported.

It is another object of the present invention to provide an all-terrain vehicle that is sufficiently small such that it can be fitted through openings into tanks and the like for use in inspection and maintenance operations.

It is another object of the present invention to provide an all-terrain vehicle that is provided with substantially simplified means for determining the relative position of the vehicle with respect to the terrain over which it is has moved.

It is another object of the present invention to provide a vehicle that has the capability of traversing various types of terrain.

It is an object of the present invention to provide a vehicle that is capable of operating over uneven terrain.

It is an object of the present invention to provide a vehicle that can sustain itself above the earth or ground and yet move forward or backward or laterally.

It is a further object of the present invention to provide a vehicle that has separate apparatus for sustaining the vehicle above the surface of the earth or ground and apparatus for propelling the vehicle in a lateral or forward direction.

The terrain vehicle of the present invention operates in hover mode, wing in ground effect mode (WIG), limited flight/ (jump and glide) mode, and quick start mode.

A person skilled in the art will note that none of the components of the all-terrain vehicle of the present invention are unique in the world. All have been used before in other ways. However, the combination of these elements in a vehicle is unique and give the all-terrain vehicle of the present invention unanticipated novel capabilities.

The present invention is a revolutionary concept for transportation over soft or rough terrains. Its main features are its ability to travel at high speed over rough terrains and cushion the occupants from the shock. The present invention is constructed using familiar technologies like engines, propellers, planning surfaces, and wheels. The present invention is very adaptable and can be used in the transportation business, the search and rescue mission, the fishing business, or as a sport vehicle.

In addition, the terrain vehicle according to the present invention (1) travels fast, (2) operates over land, ice, mud, snow and soft sand, (3) operates with minimal drag in all these environments, (4) remains stable while stationary or moving, and (5) operates with minimum potential damage to life and property in these environments.

The all-terrain vehicle for use over a variety of terrain, according to the present invention, comprises:
a main body having a cabin, a forward side, a backward side and two lateral sides;
a pair of ground effect wings connected to the lateral sides forward of the main body, each wing having an angle of attack;
an engine having necessary auxiliary equipment for operation thereof, wherein the engine is connected to the forward side of the main body and supplies a lift power to the vehicle;
at least one lift fan connected to the engine;
a wheel connected to the backward side of the main body, wherein the wheel is connected to the main body by a drive shaft;
a variable camber control system to control the angle of attack.

Further, the all-terrain vehicle of the present invention comprises a skirt attached around the perimeter of the main body, wherein the skirt determines a hovering height.

In a first preferred embodiment, the all-terrain vehicle of the present invention comprises a lift engine connected to the lift fan to power the fan.

Each ground effect wing includes one fixed wing attached to the main body and an aileron attached to the fixed wing, wherein the aileron provides stability and an angle of attack to the vehicle.

In addition, the all-terrain vehicle of the present invention comprises a control system to adjust the angle of attack.

The vehicle, according to the present invention, operates in a hover mode, a wing in ground effect mode (WIG), a jump and glide mode, and a quick start mode.

At speeds below wing in a ground effect mode, the cabin, electronics, and wings are supported by hover operation, and wherein the vehicle speed reaches the speed required going into wing in ground effect mode, the main cabin, electronics, and wings are supported at first by a combination of hover and wing and ground effect, until the main cabin reaches a height where the hover no longer contributes to the support.

In addition, the all-terrain vehicle comprises a quick start means to provide the vehicle with enough power to a drive mechanism.

The all-terrain vehicle, according to the present invention, operates in wing and ground effect mode, and when an obstacle that is higher than the vehicle appears in front of it, the angle of attack of the wings is changed, and the vehicle jumps and/or glides over the obstacle.

A person skilled in the art will note that none of the components of the all-terrain vehicle of the present invention are unique in the world. All have been used before in other ways. However, the combination of these elements in a vehicle is unique and give the all-terrain vehicle of the present invention unanticipated novel capabilities.

The foregoing has outlined rather broadly the more pertinent and important features of the present invention in order that the detailed description of the invention that follows may be better understood, and so that the present contribution to the art can be more fully appreciated. Additional features of the invention will be described hereinafter, which form the subject of the claims of the invention. It should be appreciated by those skilled in the art that the concept and the specific embodiments disclosed may be readily utilized as a basis for modifying or designing other aerators for carrying out the same purposes of the present invention. It should also be realized by those skilled in the art that such equivalent structures do not depart from the spirit and scope of the invention as set forth in the appended claims.

DESCRIPTION OF THE DRAWINGS

For a fuller understanding of the nature and objects of the present invention, reference should be made by the following detailed description taken in with the accompanying drawings in which.

DESCRIPTION OF THE INVENTION

Figure 1:
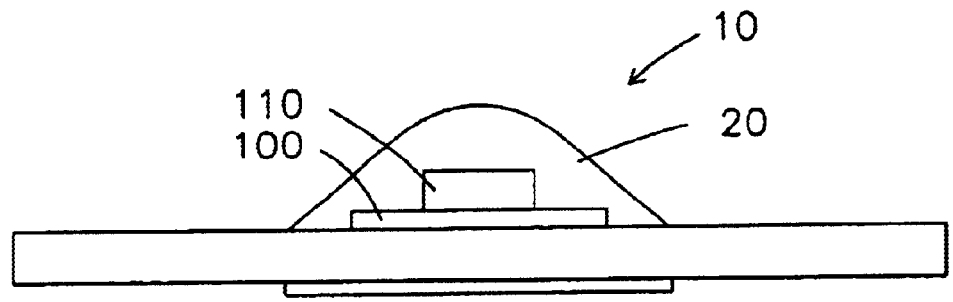
FIG. 1 is a front view of the all-terrain vehicle according to the present invention.

The terrain vehicle of the present invention operates in hover mode, wing in ground effect mode (WIG), limited flight/ (jump and glide) mode, and quick start mode.

A person skilled in the art will note that none of the components of the all-terrain vehicle of the present invention are unique in the world. All have been used before in other ways. However, the combination of these elements in a vehicle is unique and give the all-terrain vehicle of the present invention unanticipated novel capabilities.

The present invention is a revolutionary concept for transportation over soft or rough terrains. Its main features are its ability to travel at high speed over rough terrains and cushion the occupants from the shock. The present invention is constructed using familiar technologies like engines, propellers, planning surfaces, and wheels. The present invention is very adaptable and can be used in the transportation business, the search and rescue mission, the fishing business, or as a sport vehicle.

In addition, the terrain vehicle, according to the present invention, (1) travels fast, (2) operates over land, ice, mud, snow and soft sand, (3) operates with minimal drag in all these environments, (4) remains stable while stationary or moving, and (5) operates with minimum potential damage to life and property in these environments.

The all-terrain vehicle for use over a variety of terrain, the vehicle comprising:

a main body having a cabin, a forward side, a backward side and two lateral sides;

a pair of ground effect wings connected to the lateral sides forward of the main body, each wing having an angle of attack;

a lift engine with at least one lift fan connected to the engine forward the main body;

an engine to provide energy to propel the vehicle forward, the engine having necessary auxiliary equipment for operation thereof, wherein the engine is connected to the backward side of the main body and supplies a lift power to the vehicle;

a wheel connected to the backward side of the main body, wherein the wheel is connected to the main body by a drive shaft;

a variable camber control system to control the angle of attack.

The Main Body

The all-terrain vehicle 10 of the present invention comprises a main body 5 having a forward end 13, a rearward end 15, and a cabin 20. The cabin 20 can be used as a passenger compartment or space for cargo. The main body can be made of any suitable material, preferably cell foam.

Attached around the perimeter of the main body 5 is a flexible skirt 25, which contains the lift air and determines the hovering height.

The skirt 25 is a shaped, flexible strip fitted below the bottom edges of the main body. As the vehicle of the present invention lifts, the skirt extends below it to retain a much deeper cushion of air. The development of the skirt enables a vehicle to maintain its normal operating speed through rough terrain and allows it to pass over rocks, ridges and gullies.

In addition, the present invention contemplates the use of any conventional suspension system (not shown) to allow the cabin to stay relatively stable even in rough terrains. The suspension system also provides enough clearance under the cabin to avoid all but occasional contact of the cabin with the ground.

The cabin contains the necessary electrical equipment for receiving signals remotely and generating the necessary command signals to components of the vehicle.

The flight control system further includes transmitters, receivers, navigation, sensors and attitude sensors, such as a GPS receiver and multi-axis accelerometers. The flight control system may alternatively or additionally include one or more gyros, a compass, and an altimeter, all connected to a CPU to detect vehicle dynamics and flight path parameters. The sensors may also include any device capable of outputting an acceleration vector signal representing sensed vehicle motion and/or receiving control surface displacement. Such devices (as well as others) are well known in the aircraft field.

The vehicle is optionally supplied with a video camera unit mounted on the cabin. The video unit is provided with means for panning and/or tilting the camera, as well as a zoom lens, to view any desired scene within range of the vehicle.

Further, lighting means are provided in the outside of the cabin for illuminating the path when traveling at nighttime.

The cabin preferably includes a hard drive, CD ROM, DVD, RAM, ROM, or other optically readable storage, magnetic storage, or integrated circuit.

For embodiments that are to be self-contained, the cabin also includes a necessary source of power. This typically is in the form of high capacity batteries. This embodiment further includes a database including preprogrammed flight control strategy to preferably maintain parameters such as pitch attitude, roll attitude, and heading at a desired point to provide control of the vehicle. The cabin further comprises all the necessary servo-mechanisms and wireless communication circuits which allow an operator to remotely drive the vehicle in a variety of ground-hugging directions and maneuvers through the manipulation of various switches, levers, and similar control implements mounted on a hand-held console. These various mechanisms and circuits are well-known to those skilled in the art of remotely controlled devices and are not relevant to the novelty of this invention.

Drive Shaft and Wheel

Mounted on a backward end 15 of the vehicle 10 is a drive shaft 30. In the opposite side of the drive shaft 30 is a wheel 40. The drive shaft 30 connects the wheel 40 to a drive engine 50, thus the wheel can be activated to rotate in a forward or backward direction.

The wheel 40 is rotatably connected to the drive shaft by conventional means known in the art. The opposite end of the drive shaft is rotatably connected by conventional means to the drive engine 50 located in the main body 5.

Preferably, a universal joint 210 providing a limited range of motion is used for the pivotal connection between the drive shaft and the wheel.

The wheel is adapted to permit the all-terrain vehicle to traverse terrain by having the wheel in contact with the terrain such as a road and the like.

In a preferred embodiment, the drive shaft 30 may include a protective shield (not shown) to prevent potential damage to the drive shaft.

Figure 2:
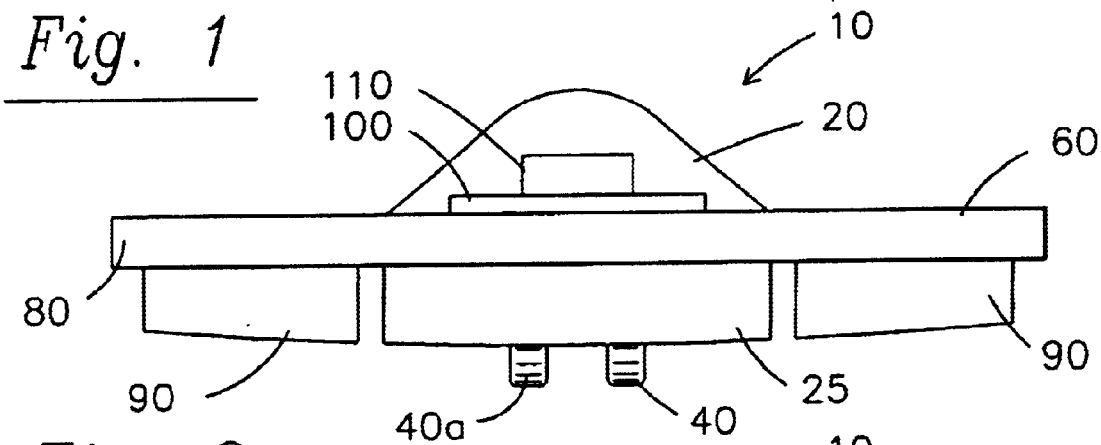
FIG. 2 is a front view of the all-terrain vehicle of the present invention in jump and glide mode.
Figure 3:
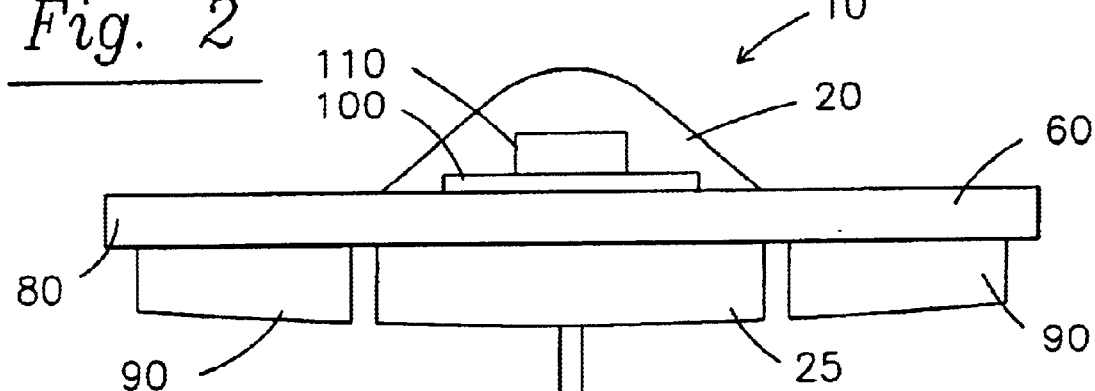
FIG. 3 is a back view of the all-terrain vehicle of the present invention in non-hovering mode.

FIG. 2 illustrates the position that the wheel 40 would be in when the all-terrain vehicle 10 is hovering above the terrain with this wheel out of contact with the terrain. FIG. 3 illustrates the position that the wheel 40 would be in when this wheel is in contact with the terrain (non-hovering mode) such as when the vehicle 10 is traveling along a road or the like.

The present invention also contemplates the use of shock absorbing means (not shown) to absorb shocks and the like that are received by the wheel 40 as it travels over small bumps and the like on roadways or other terrain so that at least a portion of such shocks and the like are not transmitted to the cabin 20 of the all-terrain vehicle 10.

The vehicle of the present invention can travel over land, ice, mud, water, snow or soft sand because it is supported by the displacement of the wheel. This means that it will not get bogged down in either rough terrain or soft terrain.

Optionally, the present invention contemplates the use of a second wheel 40a.

Ground Effect Wings

Figure 4:
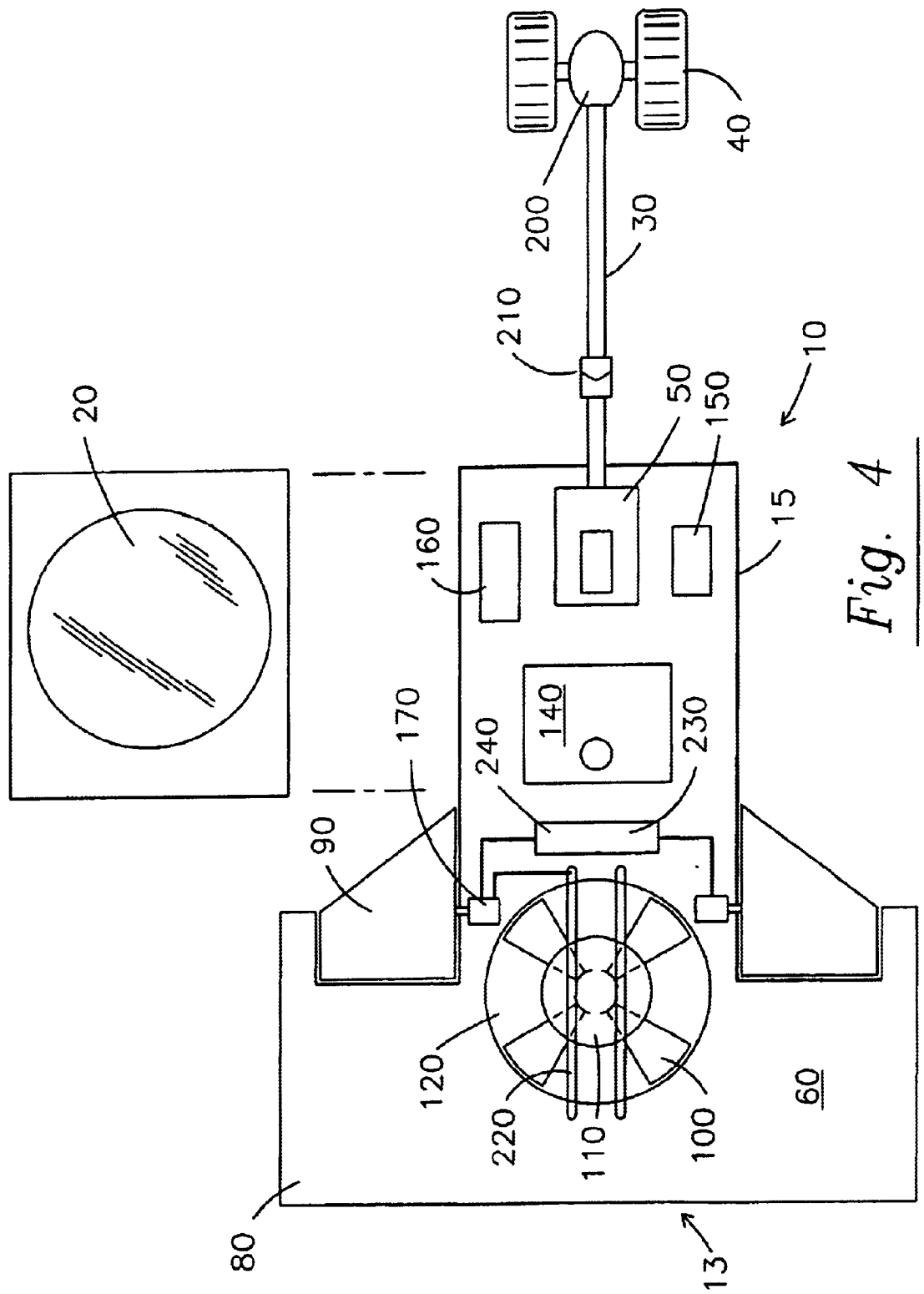
FIG. 4 is a top view of the all-terrain vehicle according to FIG. 1.

FIG. 4 of the present invention contemplates the use of at least a pair of ground effect wings 60 located in on each lateral side of the main body 5. A ground effect wing comprises a wing having one fixed end 80 attached to the main body 5 between the forward and aft portions of the main body and a aileron 90 attached to the outer periphery of the second end of the fixed wing. The aileron 90 is attached so as to form a negative dihedral angle and to be positioned through a range of sweep angles about a pivot axis (not shown), the pivot axis being defined at an angle with respect to the plane of the aileron.

The ground effect wings 60 are shaped and dimensioned to lift the vehicle after it has reached a given ground velocity, hereinafter called the "takeoff velocity" which the motor and wheel assembly must be empowered to achieve and preferably exceed. The takeoff velocity is typically ten to fifteen percent higher than the stall speed or minimum controllable air speed of the vehicle in order to accumulate enough momentum to sustain a flight of several seconds. In other words, the operator can drive the vehicle forward with the wings in their stowed position until it reaches the takeoff velocity characterizing that particular body, then trigger the deployment of the wings and cause the vehicle to take off and be airborne for a few seconds in the absence of any air propulsion means such as a propeller. The altitude and duration of the flight is directly related to the amount of kinetic energy or momentum accumulated by the vehicle at the time of takeoff.

As the accumulated kinetic energy is dissipated against the resistance of the ambient air, and the airborne speed of the vehicle falls below the level necessary to sustain the flight, the vehicle glides down toward the ground surface. The greater the takeoff speed in excess of the stall speed, the larger the duration of the flight.

The present invention also provides a variable camber control system 170 for varying wing camber to optimize wing lift/drag during the operation of the vehicle of the present invention.

The camber control system includes a means for sensing various flight conditions and parameters during the vehicle operation. Such conditions and parameters include speed, normal acceleration, weight parameters, and the dynamic pressure of air. A computer having a calculating means, operatively connected to the sensing means, receives the sensed conditions and parameters from the sensing means. The computer includes a data memory bank having stored test data that indicates the desired optimum position for each of said surfaces for optimizing said wing's L/D ratio given certain values of coefficient of lift, aircraft speed, and dynamic pressure. Thus, the computer varies the wing camber by causing only one aileron to change its position. The computer may cause such operation to be performed depending on that data which is stored for each respective surface.

Lift Engine and Lift Fans

The first preferred embodiment of the present invention contemplates including a lift engine 110, at the forward end 15 of the main body 5. The lift engine 110 is connected to and located in the same space as lift fan 100. The lift fan 100 is mounted in the main body with its rotational axis vertical so that the fan draws in air from above the main body and exhausts it in a downward direction through an aperture 120 in the underside of the main body. The air flow produced by the lift fans 100 creates a lift effect by pushing a pressurized curtain of air underneath the main body 5 forcing a separation of the vehicle 10 from the surface upon which it is resting in an air cushion manner.

The lifting fan is coupled via a gearbox to the drive engine 50. The engine also drives the propeller on the craft, which provides thrust for forward motion of the vehicle.

Figure 5:
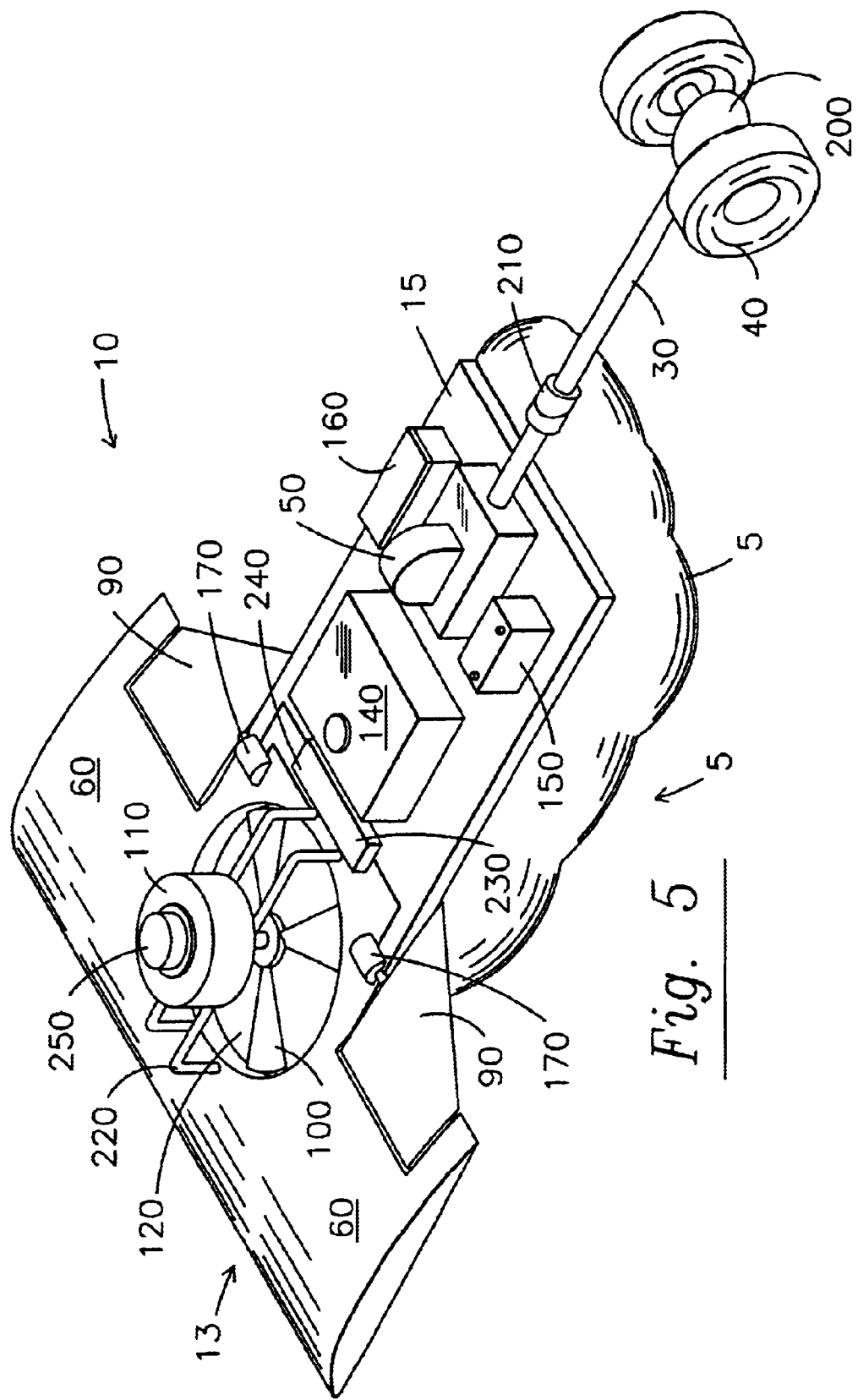
FIG. 5 shows the details of the all-terrain vehicle of the present invention.

In another embodiment, the lift fan is rotatably driven by shaft 130 from the lift engine 110. (FIG. 5)

In addition, the present invention contemplates the use of engine brackets 220 in order to keep the engine from falling trough the aperture 120.

In the enclosed space, the fan operates in a propeller would not be suitable. First, the volume of air needed is very large, and a propeller is designed to be most efficient in open air like on an aircraft. Also, the fan needs to force air into the chamber below the craft so creating a specific pressure under the craft. Propellers again are not efficient in applications when an air backpressure will be applied to the propeller blades as they rotate.

When the assembly is rotated at high speed, air is sucked into the center hole in the fan, and the slats force it out at the edges. The advantages of the fan are two fold. They operate efficiently in an environment when backpressure is high, and they will move larger volumes of air for a given rotation speed than a propeller with the same speed and power input.

The lift engine 110 includes the necessary auxiliary equipment for operation, such as a fuel tank, battery, exhaust system, and remote switch gear (not shown). The lift engine 110 is preferably the air-cooled type having an internal fan to move air across extended surface areas within the block and heads for dissipating the heat developed by the engine in operation.

The vehicle operates on the air cushion, or ground effect principle with the lift fans 100 drawing air in from the top side and delivering it into the bottom side of the main body. The compressed gas, or ambient air, is discharged from around the skirt 25 with an even escape velocity creating a lifting force. The bottom side, of the main body 5 in conjunction with the skirts 25 provides an inside surface area that is pressurized, and inasmuch as the surface upon which it is resting is relatively solid, the gap or space there between becomes the boundary for the compressed gas creating the lift effect.

The manner that the lift engine sucks the air over the wing, provides extra lift over the wing, keeps drag down by not letting the wind get to the back of craft where drag would be created when the wind hits the non-aerodynamic components, and at flight speeds, extends the range of hover by producing extra downward thrust; the speed of the air going over the wing is added to the speed of the air created by the lift engine.

Drive Engine

A drive engine 50 is rotatably mounted at the main body 5 of the vehicle 10. The drive engine 50 allows the vehicle 10 to travel forward. This drive engine 50 is also air cooled and includes the necessary auxiliary equipment for operation, such as a fuel tank 140, battery 150, electronic 160, exhaust system (not shown), and remote switch gear (not shown).

The torque output from the drive engine 50 can be converted and magnified by connecting in a torque converter 200 between the drive engine 50 and the driven shaft 30. This is especially necessary during the starting of the vehicle in order to make available the required torques and starting traction. The same applies to use on inclines.

The combination of the lifting system and drive engine allows the all-terrain vehicle of the present invention to travel over earth, sand, snow, and water, etc.

Optionally, the ground effect vehicle includes actuators for actuating the aileron through the range of aft sweep angles. Such actuators may include hydraulic assisted actuators, spring assisted actuators or other actuating mechanisms known to those skilled in the art. Such actuators are generally controlled by flight control systems adapted to control the actuator and vary the sweep of the aileron to a desired position.

In the basic embodiment of the present invention, the drive engine pushes the vehicle of the present invention, thus, the tire is driven into the ground giving traction.

In a preferred embodiment, the drive engine pulls the vehicle of the present invention as opposed to pushing the vehicle.

The all-terrain vehicle of the present invention is utilized in the following manner. Normally, a vehicle would have its wheel extended or deployed as illustrated in FIG. 3 so that the vehicle could traverse typical smooth terrain such as highways, roadways, or the like. This would permit the operator of the vehicle to bring the vehicle into the vicinity of terrain, which was not generally accessible, or conveniently accessible to wheeled type vehicles. Upon reaching a suitable location where the terrain was difficult for a wheeled vehicle, the skirts would be deployed so that the vehicle could be prepared for its hovering mode.

While operating at speeds below wing in ground effect mode, the cabin, electronics, and wings are supported by hover operation. The single appendage that connects the main body to the drive system is supported by the wheel/drive mechanism contact with the ground as well as hover. The vehicle obtains forward/reverse propulsion from the wheel drive mechanism. In this mode, the vehicle is able to traverse water and flat surfaces.

When the vehicle speed reaches the speed required going into wing in ground effect mode, the main cabin, electronics, and wings are supported at first by a combination of hover and wing and ground effect, until the main cabin reaches a height where the hover no longer contributes to the support. When the cabin height above ground lifts above the point where the hover no longer contributes, then the vehicle cabin, electronics, and wings will be supported by the wing in ground effect mode, as well as supported by the wheel and drive mechanism. At this point in time, the vehicle will be in unicycle mode. The hover then acts as a gyrostabilizer that keeps the vehicle cabin, electronics, and wings oriented parallel to the ground. In this mode, the vehicle is able to traverse rough terrain and step grades.

If it is required that the vehicle needs to quick start to get to operational height, then driver/autonomous system can apply enough power to the drive mechanism for the cabin, electronics, and wings to pop up, much like a motorcycle doing a wheelie. In this mode, the vehicle is supported almost wheelie by the drive mechanism. The cabins, electronics, and wing are kept stable by the gyroscopic effect of the hover. When the vehicle reaches the speed required to go into wing in ground effect mode, then operation will be the same as ground effect mode. In this mode, the vehicle is able to pop-up and clear obstructions to the wings and cabin until the vehicle gets to wig mode.

If the vehicle is operating in wing and ground effect 4 mode, and an obstacle appears in front of it greater than the vehicle height, the camber of the wings can be changed and/or the drive increased so that the vehicle leaves the ground (jumps) and glides over the obstacle. In the basic embodiment, the vehicle is traveling in the direction forward of the wing and the wing and driveshaft pivot in the rearward direction due to increased air resistance over their surfaces. When the vehicle slows down, gravity then takes over pulling the wheel downward to contact with the terrain and push the craft forward.

All of these attributes, when combined, make an extremely versatile and capable craft that handles all types of terrains and grades. This capability is not present in today's hover, wig, or purely ground vehicles.

The resultant vehicle has a width between 6 to 10 feet, and a height when the drive shaft is "stowed" of about 4–6 feet. The total length is between 10–16 feet with the drive shaft fully up.

The vehicle of the present invention has a lift engine of a 6-horse power Briggs, and the vehicle can lift up to 300 lbs. The Briggs is an electric start The vehicle of the present invention weighs between 50 to 100 pounds. Thus, this vehicle is very useful for many applications where larger and more complex vehicles cannot be used. Although specific construction is illustrated with regard to components of this vehicle, these are given as an illustration of a typical embodiment rather than as a limitation. Thus, the invention is to be limited only by the appended claims and their equivalents when taken in combination with this detailed description.

While my description contains many specifications, these should not be construed as limitations on the scope of the invention, but rather as an exemplification of one preferred embodiment thereof. Many other variations are possible. For example, the variations in the suspension attachment angles, the number of flotation wheels used, or whether or not the wave rider pods have a ground effect wing. Accordingly, the scope of the invention should be determined not by the embodiments illustrated, but by the appended claims and their legal equivalents.

What is claimed is:

1. An all-terrain vehicle for use over a variety of terrain, the vehicle comprising:
   a main body having a cabin, a forward side, a backward side and two lateral sides;
   a pair of ground effect wings connected to the lateral sides of the main body, each wing having an angle of attack;

an engine to provide energy to propel the vehicle forward, the engine having necessary auxiliary equipment for operation thereof, wherein the engine is connected to the forward side of the main body and supplies a lift power to the vehicle;

at least one lift engine with a least one lift fan connected to the engine;

a wheel connected to the forward side of the main body, wherein the wheel is connected to the main body by a drive shaft;

a variable camber control system to control the angle of attack.

2. The all-terrain vehicle according to claim 1, further comprising a skirt attached around the perimeter of the main body, wherein the skirt determines a hovering height.

3. The all-terrain vehicle according to claim 1, wherein each ground effect wing includes one fixed wing attached to the main body and an aileron attached to the fixed wing, wherein the aileron provides stability and an angle of attack to the vehicle.

4. The all-terrain vehicle according to claim 1, wherein the control system permits the angle of attack to be adjusted.

5. The all-terrain vehicle according to claim 1, further comprising:

a fuel tank connected to the lift engine to supply liquid fuel as an energy source for said engine; and an electrical control system connected to the lift engine for starting and stopping the lift engine.

6. The all-terrain vehicle according to claim 1, wherein the lift engine is an air-cooled type having an internal fan to move air across extended surface areas within the engine envelope.

7. The all-terrain vehicle according to claim 1, wherein the vehicle operates in a hover mode, a wing in ground effect mode (WIG), a jump and glide mode, and a quick start mode.

8. The all-terrain vehicle according to claim 1, further including a lift engine connected to at least one lift fan.

9. The all-terrain vehicle according to claim 1, further comprising a database located inside the cabin, the database including a preprogrammed flight control strategy to maintain parameters such as pitch attitude, roll attitude and heading at a desired point to provide control of the vehicle.

10. The all-terrain vehicle according to claim 1, wherein the wheel is in a retracted position when the vehicle is in a hovering mode and wherein the wheel is non-retracted position when the vehicle is in a non-hovering position.

11. The all-terrain vehicle according to claim 1, wherein the camber control system includes a means for sensing various flight conditions and parameters during the vehicle operation.

12. The all-terrain vehicle according to claim 11, wherein further including a computer located inside the cabin, the computer having a calculating means, operatively connected to the sensing means, receives the sensed conditions and parameters from the sensing means.

13. The all-terrain vehicle according to claim 12, wherein the computer varies the wing camber by causing only one aileron to change its position.

14. The all-terrain vehicle according to claim 1, wherein the lift fan is connected to and located in the same space as the lift engine.

15. The all-terrain vehicle according to claim 14, wherein the lift fan is mounted in the main body with its rotational axis vertical so that the fan draws in air from above the main body and exhausts it in a downward direction through an aperture in the underside of the main body.

16. The all-terrain vehicle according to claim 1, wherein at speeds below wing in a ground effect mode, the cabin, electronics, and wings are supported by hover operation, and wherein the vehicle speed reaches the speed required going into wing in ground effect mode, the main cabin, electronics, and wings are supported at first by a combination of hover and wing and ground effect, until the main cabin reaches a height where the hover no longer contributes to the support.

17. The all-terrain vehicle according to claim 16, wherein when the vehicle is operating in wing and ground effect mode and an obstacle that is higher than the vehicle appears in front of it, the angle of attack of the wings is changed, and the vehicle jumps and/or glides over the obstacle.

18. An all-terrain vehicle comprising:

a main body having a cabin, a first side, a second side and two lateral sides;

a pair of ground effect wings connected to the lateral sides of the main body, each wing having an angle of attack;

an engine connected to the first side of the main body;

at least one lift fan connected to the engine;

a wheel connected to the second side of the main body and lying opposite to the first side of the main body, wherein the wheel is connected to the main body by a drive shaft;

a variable camber control system to control the angle of attack.

* * * * *